United States Patent [19]
Melkersson

[11] 3,932,149
[45] Jan. 13, 1976

[54] METHOD FOR THE PURIFICATION OF SULPHURIC ACID CONTAINING MERCURY

[75] Inventor: Karl-Axel Melkersson, Helsingborg, Sweden

[73] Assignee: Boliden Aktiebolag, Stockholm, Sweden

[22] Filed: May 13, 1974

[21] Appl. No.: 469,432

[30] Foreign Application Priority Data
May 18, 1973 Sweden .............................. 7307048

[52] U.S. Cl. .......................................... 55/72; 55/73
[51] Int. Cl.² .......................................... B01D 53/14
[58] Field of Search ............ 55/72, 73, 29; 423/210, 423/544

[56] References Cited
UNITED STATES PATENTS

| | | | |
|---|---|---|---|
| 3,577,706 | 5/1971 | Moller | 55/73 X |
| 3,780,499 | 12/1973 | Dorr et al. | 55/73 X |
| 3,788,043 | 1/1974 | Dorr et al. | 55/73 X |

Primary Examiner—John Adee
Assistant Examiner—Ethel R. Cross
Attorney, Agent, or Firm—Stevens, Davis, Miller & Mosher

[57] ABSTRACT

The invention relates to a method of purifying sulphuric acid containing mercury in a plant for the production of sulphuric acid according to the contact process which involves drying moist roaster gases containing sulphur dioxide in at least two drying towers where the major part of the water content is absorbed in the first drying tower. The sulphuric acid containing mercury is in a quantity suitably measured to maintain the concentration between 70 and 80 percent by weight led to the first drying tower. To the second drying tower is led a sulphuric acid so that the concentration can be maintained between 95 and 103 percent by weight. The mercury is separated from a partial current from the circulating sulphuric acid in the first drying tower.

14 Claims, 1 Drawing Figure

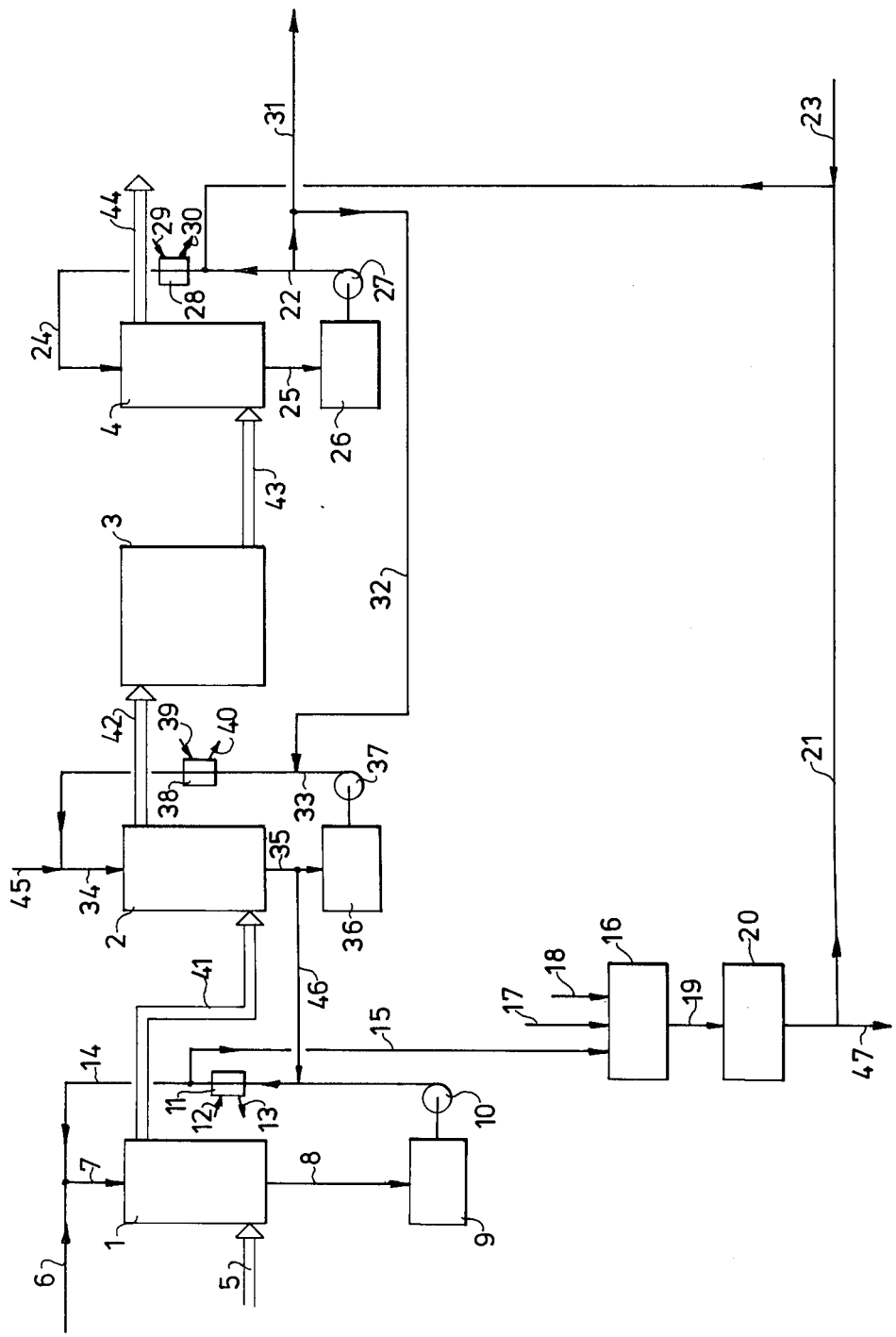

METHOD FOR THE PURIFICATION OF SULPHURIC ACID CONTAINING MERCURY

The present invention relates to the purification of sulphuric acid containing mercury in plants where moist roaster gases containing sulphur dioxide are available to be used in, for example, the preparation of sulphur trioxide or sulphuric acid.

The presence of mercury in industrial processes and the risks which this involves have recently been attracting growing attention. These problems are naturally of particularly great importance when connected with products such as fertilizers and animal feedstuffs. Sulphuric acid is used in very large quantities in the manufacturing of these products. This requires that the mercury content of the sulphuric acid be low. Even in other processes which have no direct connection with the products mentioned mercury can be introduced by way of sulphuric acid into process or product chains where evident contamination risks are present. Such a process is the preparation of hydrochloric acid and sodium sulphate from rock salt and sulphuric acid, in which the mercury largely passes to the hydrochloric acid and by way of this acid is passed on to new processes and products.

Sulphuric acid containing mercury can be obtained from sulpuric acid factories using the method of roasting metallic sulphides, for example, pyrites or zinc blende, and where the roaster gas is insufficiently purified. Even if adequate purification of the gas is carried out operational irregularities in plants of this type can temporarily lead to high Hg content in the acid produced. In such cases purification of the sulphuric acid is necessary.

A purification method for this purpose must ensure that low residual contents of mercury in the sulphuric acid are obtained and that the precipitated material containing Hg can be removed from the acid. Other toxic substances such as lead and arsenic must not be introduced into the acid either in the purification process. In certain cases several processes in rapid succession are required, for example, to limit the extent of corrosion on the apparatus of the purification plant in the handling of diluted acids.

German Pat. No. 1,216,263 describes a method by which concentrated sulphuric acid is treated with relatively large-grained elementary sulphur. Residual contents of 5 – 7$\mu$g/g are exemplified and it states that contents as low as 1$\mu$g/g can be reached. These contents are unacceptable in view of the strict purity requirements with respect to heavy metals now enforced by many countries.

Mercury can also be precipitated from sulphuric acid diluted or concentrated by treating with sulphides or hydrogen sulphides. The disadvantages of these methods described, for example, in German Pat. Nos. 1,054,972 and 1,124,024, are that the acid can be contaminated by metals introduced as metal sulphides and that the separation of precipitated mercury compounds and the acid is difficult to carry out. The hygienic risks in the formation of hydrogen sulphide must also be taken into consideration.

Swedish patent application No. 11,517/72 describes a method where mercury is first removed from the roaster gases by means of washing with sulphuric acid solutions and then from the sulphuric acid solutions by precipitation as sulphide or selenide sometimes by reduction with certain metals. The used washing acids have concentrations of between 30 and 99%. Mercury absorption by acids of such low concentration as 30o/o is extremely insignificant and it must be assumed that the method functions very unsatisfactorily as a mercury absorber if this low concentration is used. In the examples quoted an acid concentration of at least 77% $H_2SO_4$ is used, which accords better with the known fact that mercury absorption to any significant extent begins with an acid concentration of approx. 70% $H_2SO_4$. The possibilities of controlling the water balance are also unfavourably affected when an over-diluted acid is used in the first step of the treatment. Sulphuric acid purification combined with washing systems suffers also from the disadvantages described above concerning the introduction of other impurities into the acid and problems of separation.

The treatment of roaster gases in two (or more) steps with different acid concentrations as was used in previous processes is otherwise already known. German Pat. No. 1,792,573 describes a method for avoiding the production of "black" acid from roaster gases containing organic compounds. The first drying is effected in a step where the acid concentration is between 50 and 70%, which is so low that no oxidation of the organic compounds can take place. In a second tower the final drying takes place at the same time as the partially carbonized organic compounds are absorbed by the black sulphuric acid. Because of the pre-drying a relatively small quantity of the "black" acid is thereby produced in the second step.

According to German Pat. No. 1,124,024 diluted sulphuric acid (20% according to example in the patent specification) can be purified of dissolved mercury by treating with small quantities of hydrogen sulphide of sulphides in the presence of active carbon. The treatment can suitably be effected by allowing the acid after the addition of sulphide to pass over a bed of active carbon so that they are in contact with each other for 5 – 10 minutes and after the addition of hydrogen peroxide to destroy remaining quantities of sulphide to pass over a further bed of active carbon with a contact time of 3 – 6 mins. Residual contents of mercury corresponding to < 0.1 g/t concentrated acid are recorded.

The present invention relates to a process for the purification of sulphuric acid by use of the drying system in a roasting gas purification plant by which the concentrated sulphuric acid containing mercury wholly or partially derived from sulphuric acid produced in another plant is led to a circulating sulphuric acid in a first drying tower in a plant for the production of sulphuric acid according to the contact process which involves drying moist roaster gases containing sulphur dioxide in at least two drying towers, where the major part of the water content is absorbed in the first drying tower. The quantity of sulphuric acid should be suitably measured to maintain a concentration of between 70 and 85 percent by weight and in that sulphur trioxide, oleum or sulphuric acid is led to a circulation circuit of sulphuric acid in the second drying tower so that the concentration can be maintained at between 95 and 103 percent by weight and that a partial current from the circulating sulphuric acid in the second drying tower is led to the circulating sulphuric acid in the first drying tower and that a partial current from the circulating sulphuric acid in the first drying tower is removed and purified of mercury by a normal known method and is led off as product acid or led to the absorber which is an integral part of a sulphuric acid plant using the contact process.

The removal of mercury from the above mentioned partial current from the circulating sulphuric acid can be effected by addition of at least one thiosulphate in such a quantity that mercury present is bound or absorbed to a considerable extent to precipitated solid sulphur particles.

The method thus involves using the water content of the moist gases to dilute the acid containing mercury by which more economic purification process is obtained. It is thus possible to purify sulphuric acid containing mercury at the same time as moist roaster gases are purified of any mercury content and the method makes possible an optimization leading to significant technical advantages in the process. It has been demonstrated that the present method makes it possible to obtain larger quantities of mercury-free sulphuric acid from an already-existing plant.

This result is obtained by diluting the acid to 70 – 85%, a concentration which makes advanced drying of the gas possible at the same time as considerable mercury absorption from the gas is achieved. The removal of any mercury from the gas is promoted by the fact that mercury in concentrated sulphuric acid is present practically exclusively as divalent mercury which in solution gives the following reaction:

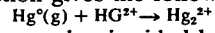
$Hg°(g) + Hg^{2+} \rightarrow Hg_2^{2+}$

This reaction is aided by a high mercury (II) ion content in the acid.

By "a thiosulphate" is meant a soluble thiosulphate preferably of an alkali metal. Since sodium thiosulphate is the cheapest thiosulphate it is preferable to use this. Potassium thiosulphate, ammonium thiosulphate, iron thiosulphate, lithium thiosulphate and other soluble thiosulphates can also be used. It is essential that the metallic ion impurity that is thereby introduced can be accepted in the final product. A certain content of sodium is normally not injurious. Thiosulphate is added in the proportion of 0.04 to 10 kg/m³ sulphuric acid and suitably 0.2 – 5 kg sodium thiosulphate (calculated as pentahydrate) in a water solution.

The drawing illustrates a flow diagram for the method of removing mercury from a sulfuric acid containing gas stream.

A drying plant for sulphuric acid consisting of a first drying tower 1, a second drying tower 2, a converter 3 and an absorber 4. A moist roaster gas containing sulphur dioxide and possibly also elementary mercury is led via 5 to the first drying tower 1. If the roaster gases after roasting contains solid or gaseous mercury compounds, these are effectively collected in the wash which takes place in a washing tower (not shown) which normally precedes drying devices according to, for example, Swedish Pat. No. 334,598 and where the gas is saturated with water. In the first drying tower the gas is dried with the sulphuric acid containing mercury which is to be purified and which is led to drying tower 1 by conduit 6 and further by conduit 7. In drying tower 1 the gas flows in countercurrent to the sulphuric acid stream whereby the major part of the water content of the gas is absorbed by the acid. The concentration of the acid thereby falls but it is tried not to let this fall below approx. 70–85% since the water-vapour pressure above the acid thereby becomes much too high to enable the gas to be dried effectively. If mercury in elementary form accompanies the gas this will be absorbed by the acid to a great extent. The acid is led from the first drying tower 1 through conduit 8 to the circulation tank 9 and from there by means of a circulation pump 10 to an acid cooler 11 where the acid is cooled indirectly to a temperature of 20° – 100°C, preferably 30° – 80°C, by water supplied through conduit 12 and led off through conduit 13. After cooling the acid is returned to the first drying tower by conduit 14. By means of conduit 15 the cooled acid is drained and led to the mixing tank 16 where a thiosulphate solution is supplied through conduit 17 and possibly also water through conduit 18 so as to improve the precipitation.

From the mixing tank 16 the sulphuric acid is led through conduit 19 to a separation device 20 where the precipitated solid material carrying the mercury content of the sulphuric acid is separated. Device 20 can consist of a filter press, a centrifugal filter, a centrifuge, a flotation cell or any other suitable device for separating precipitated material. The separated material can with advantage be transferred to the roasting furnace and be combusted. In this case 100% of the mercury will accompany the roaster gases and approximately 90% of this will be separated from the gases in the gas purification device located prior to the drying tower. Mercury can thus be led out of the process without any risk of accumulating in the purification system.

From the separation device 20 the sulphuric acid is led through conduit 21 in a circulation circuit 22 connected to the absorber 4. If the sulphuric acid supplied is insufficient to absorb the sulphur trioxide formed in the converter 3 water can be led through conduit 23 into the circulation circuit. The sulphuric acid is led through conduit 24 to the absorber and from there via conduit 25 to a circulation tank 26 and a circulation pump 27. The acid in the circulation circuit is indirectly cooled in cooler 28 by means of water supplied through conduit 29 and led off through conduit 30. The concentrated acid formed in the absorber 4 is led away through conduit 31 as product acid. In the process of sulphuric acid purification shown in the FIGURE a partial current of concentrated acid is led to a circulation circuit 33 for the second drying tower 2. Concentrated sulphuric acid is led in this to the second drying tower 2 through conduit 34 where the roaster gas is dried sufficiently to be led to the converter. In the second drying tower any possible remains of mercury will also be absorbed by the sulphuric acid.

From the second drying tower 2 the sulphuric acid is led through conduit 35 to a circulation tank 36 and a circulation pump 37. If necessary the acid is indirectly cooled in a cooler 38 whereby water is led to the cooler by conduit 39 and led off through conduit 40.

The gas is led from the first drying tower 1 through conduit 41 to the second drying tower 2 and thereafter through conduit 42 to the converter 3 and thence through conduit 43 to the absorber 4 and finally as waste gases to the atmosphere through conduit 44.

Since, as mentioned above, the purifying mercury-absorbing effect of the sulphuric acid is greater in the presence of mercury (II) ions the sulphuric acid containing mercury can alternatively wholly or partially be led to the circulation circuit 33 of the second cooling tower through conduit 45. This method can be used to advantage in those cases where a concentrated sulphuric acid containing mercury is available. In this case the partial current need not be led to the second drying tower 2 through conduit 32. To compensate the quantity of acid added to the circulation circuit 33 sulphuric acid is led off from this through conduit 46 to the circulation circuit in the first drying tower 1. This acid must be purified of mercury in some suitable way because it contains mercury absorbed in the second drying tower 2 or present in the added acid. Through conduit 15 the sulphuric acid then reaches the precipitation device 16 and the separation device 20.

If large quantities of sulphuric acid are to be purified with lesser quantities of roaster gases a diluted acid can be led off through conduit 47 as product acid in a partial current from conduit 21.

The sulphuric acid concentration in the first step is maintained by the addition of acid with a higher concentration either from the absorber of the sulphuric acid factory or from outside. By virtue of the fact that both of these possibilities are available, the running of the first step can be made very flexible and contribute to the total economy of the plant by the fact that sulphuric acid containing mercury supplied from outside when available can be purified in the sulphuric acid factory's purification system. Without altering the water balance a factory with access to outside sulphuric acid containing mercury with a concentration of 95% can deliver approx. 50% more mercury-purified acid compared with running without the addition of external acid. It is also feasible to add external acid of a lower concentration without the concentration of the produced acid falling below 95%. In this way a maximum of approx. 75% more Hg-purified acid with 95% $H_2SO_4$ can be delivered. Even greater production of Hg-purified acid can be obtained but a certain proportion of the production must thereby be led off in the form of diluted acid. By the addition of 85% acid containing mercury from outside a total of approx. 115% more Hg-purified acid can be produced, for example, but approx. 1/5 of this must be led off as 78% acid.

In the second stage a strongly oxidizing environment is maintained in order to facilitate the absorption and oxidation of mercury. The concentration of $H_2SO_4$ in this step can be held at 95–103% by adding concentrated 98.5% acid from the absorption circuit of the plant or of oleum from a separate oleum production tower or by introducing $SO_3$ directly into a separate tower in circulation connection with the washing tower or directly into the second washing step. The advantages of a high $H_2SO_4$ in this step are that a high oxidation potential is reached and also that production of sulphuric acid in this step is low. A system in which the acid concentrations are 78% and 99.5% in the first and second steps of the process and in which the second step is supplied with oleum with 106% $H_2SO_4$, can be mentioned as example. Acid production in the second step is then of a total acid production of approx. 30 t 100% $H_2SO_4$/h only approx. 0.26 t/h i.e. less than 1% of the total production. An even smaller acid production is achieved by using $SO_3$; in the abovementioned case only approx. 90 kg $H_2SO_4$/h is thereby produced in the second washing step which can, for example, be destroyed in the roasting furnace.

Mercury in the form of $HgSO_4$ can be extracted from the second step of the treatment if the Hg content of the acid is allowed to rise to the solubility level for Hg for that particular acid concentration. A pure mercury compound is hereby extracted.

In the purifying step mercury is removed to very low residual contents by the addition of thiosulphate to the washing acid which by the absorption of water from the roaster gas and/or through the addition of external acid is diluted to 70–85% $H_2SO_4$. Thiosulphate which is added in the form of an approx. 50% water solution of $Na_2S_2O_3 \cdot 5H_2O$ is hereby transformed into the final products $SO_3^{2-}$ and S. The sulphur so formed precipitates in solid form and it has been shown that the sulphur particles under these conditions are at first present in colloidal fine powder of a highly reactive form but that an agglomeration successively takes place. This means that in the beginning there is a large homogeneously-distributed, highly reactive sulphur surface in the acid which can absorb Hg very effectively and that at a later stage there is a change to relatively large agglomerates of sulphur particles which can with ease be separated from the acid by, for example, filtering, flotation or some other suitable technique without the difficulties that apparently accompany sulphide precipitation of Hg.

The formation of the large highly-reactive sulphur surface in the early stage of the precipitation process also means that the required quantity of thiosulphate is small.

The required quantity of thiosulphate in relation to the quantity of mercury in the acid and the residual content of mercury obtained are presented in the table below. Sulphate is added in the form of a solution of sodium thiosulphate and water.

| Hg µg/g Initial content | Residual content | Added quantity of thiosulphate kg/m³ (calculated as $Na_2S_2O_3 \cdot 5H_2O$) |
|---|---|---|
| 50 | 0.5 | 2.0 |
| 50 | 0.2 | 5.0 |
| 25 | 0.5 | 1.0 |
| 25 | 0.2 | 2.0 |
| 15 | 0.5 | 0.3 |
| 15 | 0.2 | 0.5 |
| 15 | 0.1 | 1.0 |
| 8 | 0.2 | 0.5 |
| 8 | 0.1 | 0.7 |
| 8 | 0.05 | 1.7 |

A separation step in the process (filtering, centrifuging, flotation) has the added advantage that mercury in particle form, which, particularly in irregular running but to a less extent during normal running, can accompany the roaster gases is absorbed by the sulphuric acid and removed in the separation step.

To illustrate the invention an example is given below where the process variables in an actual plant are given.

EXAMPLE

A 95% sulphuric acid containing 24.5 µg Hg/g was to be purified and 16.3 t/h were led to a drying tower. 53000 Nm³ roasting gas previously purified in cyclones, electro-filters and water wash were also led into the drying tower. The gas contained 13% sulphur dioxide and 70 g $H_2O$/m³. The temperature of gas introduced was 45°C. The sulphuric acid was supplied to a circulation circuit in which the sulphuric acid content was held at approx. 78% and the temperature at 30°C by cooling. From the circulation circuit 21.3 tons 78% sulphuric acid per hour were extracted which corresponded to the 16.3 tons which were supplied to the circulation circuit together with 1.1 t/h from an additional gas-drying tower. This diluted acid was led to a mixing tank where 9 kg sodium thiosulphate (calculated as penta-hydrate) were added in the form of a water solution. The mercury present was precipitated on the sulphur which was formed in the acid as very fine particles. The sulphur particles thus formed were thereafter separated in a filter press and then the separated solid material containing mercury was led to destruction in the roasting furnace in which the gas was formed. The purified acid was led to a sulphur trioxide absorption tower where the concentration was raised by absorption of sulphur trioxide to 98.5%. The sulphur trioxide used for absorption was produced by the oxidation of sulphur dioxide in the dried gas of the converter to sulphur trioxide. Before the gas could be introduced into the converter it was further dried in a second drying circuit with 97% sulphuric acid at 60°C. This acid was circulated and the circuit was supplied with 1.1 ton 98.5% sulphuric acid per hour, in this case product acid, after which a corresponding quantity (1.1 ton/h) was led out of the circuit and transferred to the circulation circuit in the first drying tower. The gas introduced contained 15 mg Hg per $m^3$ as well. This quantity of mercury was absorbed by the circulating sulphuric acid in the two drying towers and separated together with the quantity of mercury that was originally present in the acid.

I claim:

1. A method of purifying sulphuric acid containing mercury and producing a substantially mercury-free sulphuric acid in a plant for the production of sulphuric acid according to the contact process, which involves drying moist roaster gases containing sulphur dioxide in at least two drying towers, where the major part of the water content is absorbed in the first drying tower, characterized in adding the sulphuric acid containing mercury wholly or partially deriving from sulphuric acid produced in another plant to a circulating sulphuric acid in the first drying tower, the quantity suitably measured to maintain a concentration of between 70 and 85 percent by weight;

leading sulphur trioxide, oleum or sulphuric acid to a circulation circuit of sulphuric acid in the second drying tower so that the concentration can be maintained at between 95 and 103 percent by weight;

leading a partial current from the circulating sulphuric acid in the second drying tower to the circulating sulphuric acid in the first drying tower;

removing a partial current from the circulating sulphuric acid in the first drying tower;

purifying said acid current by means of precipitating mercury; leading off said purified acid current as product acid or leading it to the absorber which is an integral part of a sulphuric acid plant using the contact process.

2. A method according to claim 1, characterized in that the concentration of the sulphuric acid in the first drying tower is regulated to between 77 and 85 percent by weight.

3. A method according to claim 1, characterized in that the acid containing mercury is led to the circulating circuit of sulphuric acid in the second drying tower and from there transferred to the circulating sulphuric acid circuit in the first drying tower.

4. A method according to claim 1, characterized in that mercury is precipitated by the addition of a thiosulphate to the sulphuric acid in such quantity that any mercury present is to a considerable extent bound to or absorbed on precipitated sulphur particles and that the sulphuric acid is purified of mercury by the separation of the above mentioned precipitated sulphuric particles.

5. A method according to claim 1, characterized in that the thiosulphate used is a thiosulphate of an alkali metal or iron.

6. A method according to claim 1, characterized in that the thiosulphate used is an alkali thiosulphate in a proportion of 0.04 to 10 kg per $m^3$ sulphuric acid.

7. A method according to claim 6, characterized in that 0.2 – 5 kg sodium-thiosulphate solution is added to each $m^3$ of sulphuric acid.

8. A method according to claim 1, characterized in that the temperature of the acid is regulated to between 20°–100°C, preferably 30°–80°C.

9. A method according to claim 1, characterized in that the sulphuric acid is supplied to the second drying tower to which the roaster gas is led after preparatory drying in the first drying tower and in that the sulphuric acid is thereafter transferred to the above mentioned first drying tower where the water content of gas is absorbed.

10. A method according to claim 1, characterized in that the mercury absorbed by the solid sulphur particles is transferred to a roasting furnace for sulphidic material and combusted.

11. A method according to claim 1, characterized in that the separation of the precipitating solid sulphur particles is effected in a filter press.

12. A method according to claim 1, characterized in that the separation of precipitated solid sulphur particles is effected by means of centrifuging preferably by a filter centrifuge.

13. A method according to claim 1, characterized in that the separation of precipitating solid sulphur particles is effected by means of flotation.

14. A method according to claim 1, characterized in that the temperature of the gas introduced is held and maintained at 20° – 100°C, preferably 30° – 60°C.

* * * * *